United States Patent [19]

McBurnett

[11] 3,958,657
[45] May 25, 1976

[54] FLOW COMPENSATING EMERGENCY HYDRAULIC SYSTEM

[75] Inventor: James R. McBurnett, Corinth, Miss.

[73] Assignee: Tyrone Hydraulics, Inc., Corinth, Miss.

[22] Filed: Apr. 7, 1975

[21] Appl. No.: 565,716

[52] U.S. Cl. .................................. 180/133; 60/405
[51] Int. Cl.² .................... F15B 20/00; B62D 5/08
[58] Field of Search .................. 180/79.2 R; 60/405

[56] References Cited
UNITED STATES PATENTS

| | | | |
|---|---|---|---|
| 3,631,937 | 1/1972 | Joyce | 180/79.2 B |
| 3,747,725 | 7/1973 | Feustel | 180/79.2 R |
| 3,851,721 | 12/1974 | Comer et al. | 180/79.2 R |
| 3,896,618 | 7/1975 | Smith | 60/405 |

Primary Examiner—Robert R. Song
Assistant Examiner—R. Schrecengost
Attorney, Agent, or Firm—Synnestvedt & Lechner

[57] ABSTRACT

An Emergency or back-up Hydraulic System for use with a primary hydraulic system in motor operated equipment is disclosed. The system illustrated is a steering system for a vehicle and includes a motor driven pump and a wheel driven pump for supplying hydraulic fluid to the steering system of the vehicle. The motor driven pump and the wheel driven pump are connected in series so that the fluid discharged from the motor driven pump is supplied to the inlet of the wheel driven pump. The inlet of the wheel driven pump also communicates with the reservoir as for example through the anticavitation check for the engine driven pump. By-pass connections are provided around the wheel driven pump so that fluid in excess of the demands of that pump are channelled to the steering circuit when the engine driven pump is in operation. The system disclosed provides that the demands of the wheel driven pump are met by the engine driven pump and/or the reservoir depending upon the relative speeds and capacities of the engine and the wheel driven pumps. The system disclosed is flow limiting so that the steering or other hydraulic system is not overwhelmed when both pumps are in operation.

12 Claims, 4 Drawing Figures

FLOW COMPENSATING EMERGENCY HYDRAULIC SYSTEM

FIELD OF THE INVENTION

This invention relates to emergency or back-up hydraulic systems in vehicles and the like for providing a source hydraulic fluid upon failure of the primary source of fluid. Although not limited thereto, the invention is particularly adapted to be used in steering circuits of large-tired earth moving equipment.

BACKGROUND OF THE INVENTION AND THE PRIOR ART

In hydraulically operated power steering systems, a pump driven by the vehicle engine is provided for supplying fluid under pressure to a steering valve controlled by the vehicle steering wheel. In equipment such as earth movers, if the engine fails while the vehicle is in motion, the vehicle may be nearly impossible to steer especially if it is on a hill at the time of power failure.

The prior art discloses various arrangements whereby a supplementary or emergency pump is provided for supplying hydraulic fluid to the steering valve should the primary source of power fail. One example of such a system is disclosed in U.S. Pat. No. 3,631,937. In the system disclosed in that patent, pressurized fluid is provided by means of a supplementary pump which is driven by a drive connection with the wheels of the vehicle so that the supplementary pump is driven whenever the vehicle is in motion. The flow from this supplementary pump is added to the flow from the engine driven pump when the engine is in operation so that the fluid supplied to the steering valve is additive when both pumps are in operation. A desirable feature of the U.S. Pat. No. 3,631,937 is that the supplementary pump is reversably operated so that it will continue to supply fluid to the steering circuit regardless of the direction of movement of the vehicle.

Another approach to the problem is disclosed in U.S. Pat. No. 3,851,721. The system disclosed in this patent also includes an engine driven pump and a wheel driven pump. The fluid supplied to the steering circuit is the sum of the volumes discharged by the wheel and engine driven pumps. In contrast to U.S. Pat. No. 3,631,937, U.S. Pat. No. 3,851,721 does not supply fluid to the steering circuit when the vehicle is in reverse.

Although the systems described in the above two identified patents are simple and effective for many applications, a problem can arise in their use when both pumps are in operation, because the flow derived from the pumps is additive and may overwhelm or exceed the capacity of the steering circuit at high engine and ground speeds. Moreover there is a well recognized speed limitation for the wheel driven pump, since at high pump speeds, as is known to those in the art, gasification of the hydraulic fluid and cavitation at the inlet of that pump may result. A partial solution to this problem lies in the employment of a relatively small displacement wheel driven pump so as to prevent excess flow to the steering circuit when both pumps are in operation. However this approach limits the amount of fluid available from the wheel driven pump, so that steering may still be difficult upon engine failure. In addition, cavitation problems are not necessarily avoided by use of a small pump.

Other systems known in the art incorporate the use of a pilot valve which unloads the fluid discharged by the wheel driven pump to tank so long as the engine driven pump is in operation. Such systems do not solve the cavitation problem but do avoid the problem of overwhelming the steering circuit when both pumps are in operation and make it practical to use a wheel driven pump of large capacity if desired. However, the use of, pilot operated unloading valve introduces an additional complicating factor in the circuit. The unloading valve must be fool-proof in operation since the essence of an emergency system is that it must be absolutely dependable. Furthermore the use of an unloading valve results in momentary loss of steering in an emergency situation since the engine must stop before flow from the wheel driven pump is diverted to the steering circuit. Even momentary loss of control of the vehicle can be hazardous in a true emergency situation.

SUMMARY AND OBJECTS OF THE INVENTION

The present invention is directed towards overcoming the problems mentioned above by providing an extremely simple system involving an engine driven and a wheel driven pump connected together so that the wheel driven pump cannot overwhelm the circuit to which the fluid is supplied even when large displacement wheel driven pumps are used. The system of the present invention avoids the use of an unloading valve for diverting excessive flow away from the steering circuit and provides an instantly responsive emergency source of fluid in the event of engine failure. An important object of the invention is the provision of an emergency hydraulic circuit incorporating features which accomplish these results.

Another important object of the invention is the provision in a steering system, of a simple and effective back-up hydraulic system which permits the use of a sufficiently large back-up pump so that there is no loss of steering control during emergency situations.

A still further object of the invention is the provision of an emergency steering system in which the back-up or emergency pump has a very low power, demand thereby conserving energy and prolonging pump life.

A still further object of the invention is the provision of an emergency pump which may be driven at high speeds without risk of gasification of hydraulic fluid and cavitation.

The above and various other objects of the invention are achieved in equipment having a motor-driven pump having supply and discharge passages for supplying fluid under pressure to a hydraulic system, by an auxiliary pump driven independently of the motor driven pump as by a drive connection with the wheels of a vehicle so that it is operated whenever the vehicle is in motion. Conduit means serially connect the reservoir, the motor driven pump and the auxiliary pump with the hydraulic system so that fluid discharged by the motor driven pump is supplied to the inlet of the auxiliary pump. A second conduit means provides for a by-pass to the system for any fluid discharged by the motor driven pump which is not required by the auxiliary pump. Conduit means are also provided for the supply of fluid to the inlet of the auxiliary pump so that fluid demands of the auxiliary pump not met by the motor driven pump are satisfied.

DESCRIPTION OF THE DRAWINGS

In the following detailed description of the preferred embodiment of the invention, reference is made to the accompanying drawings in which.

Figure 1:
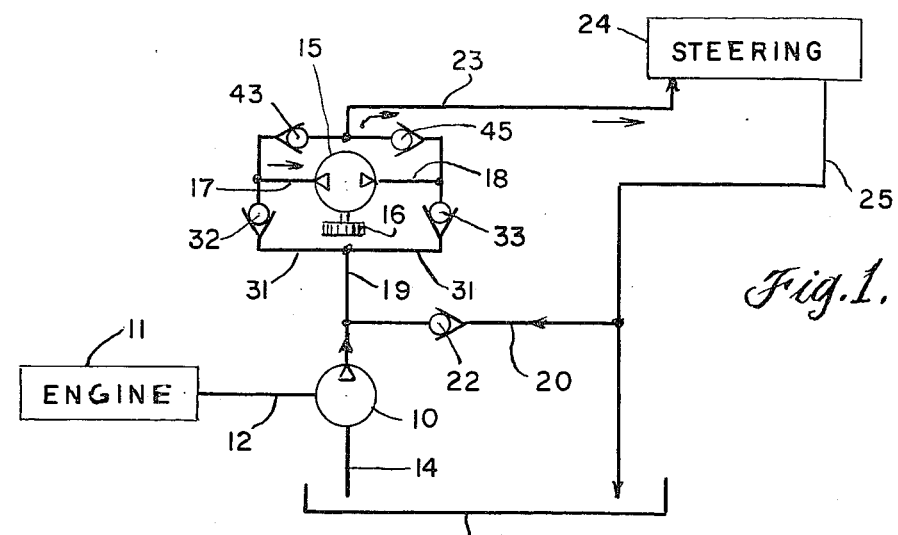
FIG. 1 is a schematic view of a preferred embodiment of the present invention.

Turning first to FIG. 1, there is shown in schematic form a hydraulic steering circuit incorporating the principles of the present invention. The system of FIG. 1 comprises first pump means, which is preferably a gear pump, illustrated schematically, and identified by reference character 10. Pump 10 is driven by a prime mover 11, which is the prime mover of the vehicle in which the system is incorporated by means of a suitable drive connection 12. Pump means 10 draws fluid from a reservoir 13 by way of conduit means 14.

The invention contemplates the use of a second or auxiliary pump means which is also preferably a pump of the gear-type, shown schematically at 15. This second pump means serves as the back-up or emergency source of fluid of the present invention. Pump 15 is adapted to be driven by the vehicle, as for example by a drive connection 16 which is connected to the wheels of the vehicle or to some other part which imparts rotary motion to the pump whenever the vehicle is in motion. Pump 15 is preferably reversible and is provided with passages 17 and 18, which serve alternately as fluid suction and discharge passages depending upon the direction of rotation of the pump via the drive connection 16.

As can be seen from FIG. 1, fluid discharged by pump 10 is available to the pump 15 as will appear more fully hereinbelow.

Fluid from the reservoir is also available to the pump 15 via a passage 20 in which is located check valve 22 which prevents flow from pump 10 directly to the reservoir. Passage 20 also serves as an anticavitation passage for pump 10 when that pump is driven in the reverse direction.

The circuit further comprises passage means generally indicated at 23 for conducting fluid from the pump means 10 and 15 to the steering circuit schematically depicted by the block 24.

Steering circuit 24 is of conventional design involving, for example, a valve which directs fluid to hydraulic rams which turn the vehicle in accordance with the position of a steering wheel, not shown. A return line 25 is provided for the purpose of returning fluid from steering circuit 24 back to the reservoir 13.

Figure 2:
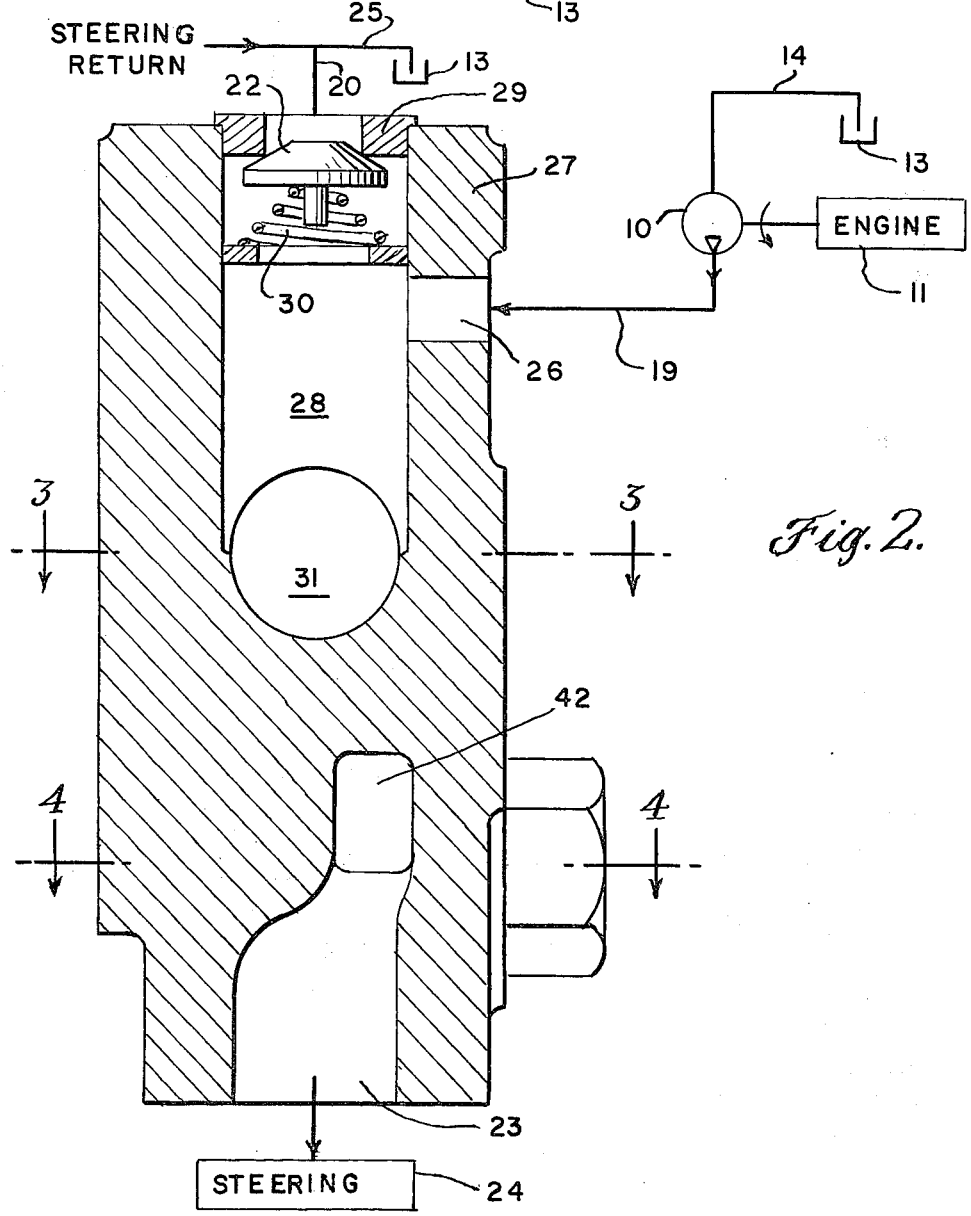
FIG. 2 is a sectional view of a valve for a wheel driven pump showing in schematic form certain features of the circuit in which the valve is incorporated.
Figure 3:
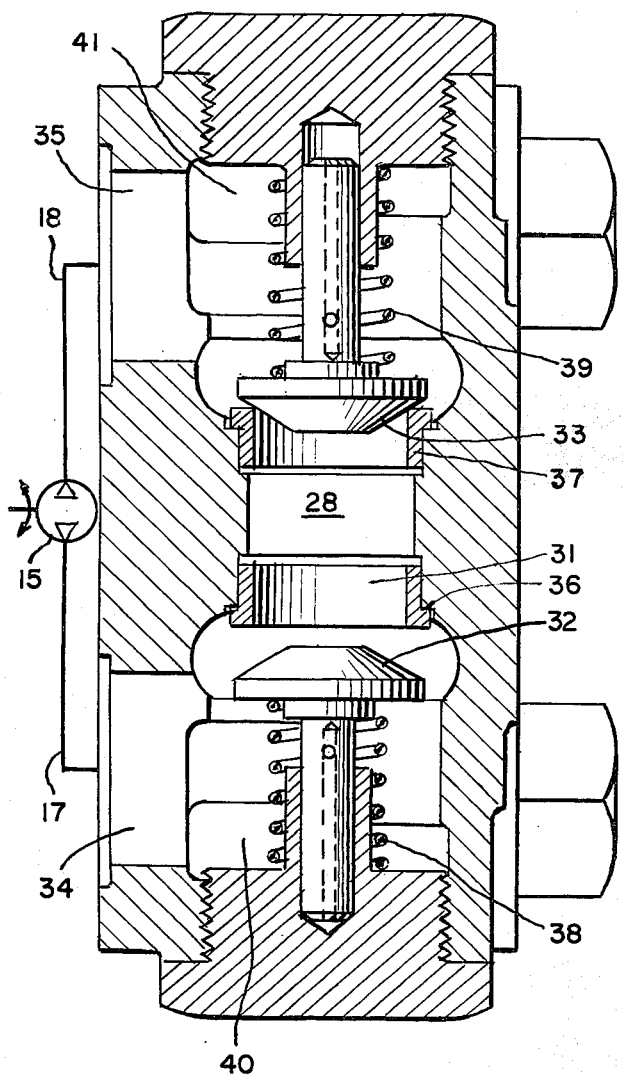
FIG. 3 is a sectional view taken along line 3—3 of FIG. 2.
Figure 4:
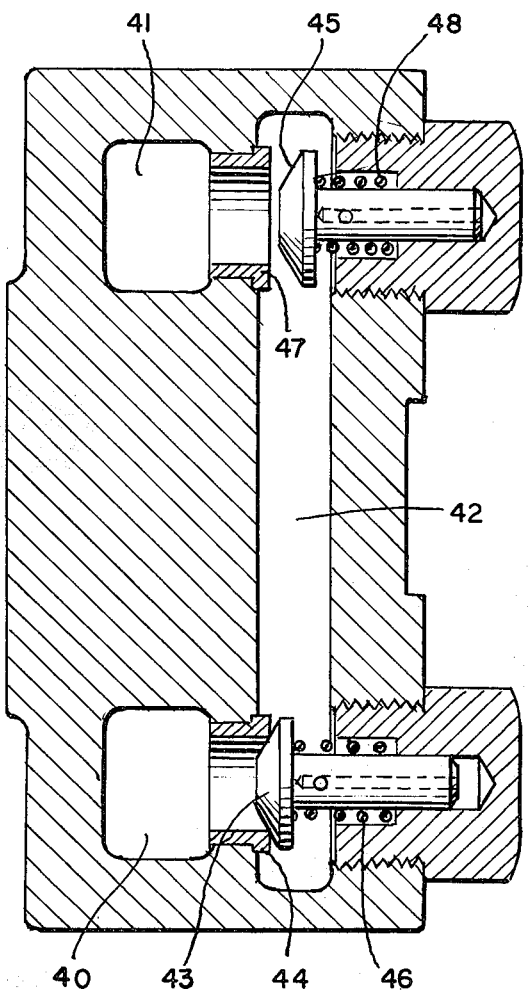
FIG. 4 is a sectional view taken along line 4—4 of FIG. 2.

A preferred form of valving useful in carrying out the invention is further illustrated in FIGS. 2 through 4. In FIG. 2, fluid from the reservoir 13 is supplied to the engine driven pump 10 via the passage 14. Pump 10 discharges fluid under pressure through a passage 19 which leads to an inlet 26 drilled in a valve housing 27 which may be secured to the housing of pump 15 in a manner not shown. Inlet 26 communicates with a chamber 28 located centrally of the upper part of the valve housing 27 as illustrated in FIGS. 2 and 3. Check valve 22 is located at the upper end of this chamber and is urged against an annular seat 29 by means of a spring 30. Check valve 22 allows for the supply of fluid from the reservoir 13 via conduit or cross-passage 31 while preventing any fluid discharged by pump 10 from flowing directly to the reservoir.

The cross-passage 31 is located at the lower end of chamber 28 as the housing is illustrted in FIG. 2. Check valves 32 and 33 (FIGS. 1 and 3) are located in cross-passage 31 and serve to channel the flow through opening 34 or opening 35 depending on the direction of operation of wheel driven pump means 15. As can be seen in FIG. 3, the check valves 32 and 33 are preferably biased to the closed position in which they are urged against seats 36 and 37 by means of springs 38 and 39.

Referring to FIG. 3, assume first that pump 15 is driven by the vehicle in the direction in which passage 17 is serving as the pump suction passage. Since passage 17 is at a low pressure as compared with passage 18, check valve 32 opens to admit fluid flowing from the reservoir via check valve 22 (FIGS. 1 and 2) or from the engine driven pump 10, through passage 19, inlet 26, chamber 28, around the check valve 32 and through passage 17 to pump 15. Fluid discharged by pump 15 through passage 18 is prevented from returning to chamber 28 because of the existence of the check valve 33.

Passages 40 and 41 are provided in the housing 27 for the fluid discharged by pump 15 and also for the bypass of fluid from pump 10 which is not demanded by pump 15. Passage 40 communicates with opening 34 and one end of cross-passage 31 and leads downwardly to the plane of FIG. 4 where it communicates with a cross-passage 42 via a discharge check valve 43. The check valve 43 is urged against an annular seat 44 by means of a spring 46. Similarly, passage 41 communicates with the other end of cross passage 31 and with opening 35 and leads to the plane of FIG. 4 where it communicates with the cross passage of 42 by means discharge check valve 45. Check valve 45 is urged to the closed position against seat 47 by a spring 48. Cross-passage 42 is in communication with the steering circuit via the passage 23 as shown in FIGS. 1 and 2.

In the event that the vehicle is moving in reverse, passage 18 serves as the suction passage for pump 15 and passage 17 as the discharge passage. Pump 15 is supplied with fluid from pump 10 unless that pump is not operating or is operating in reverse. Fluid demands of pump 15 not met by pump 10 enter housing 27 from the reservoir via check valve 22. Since passage 18 is at lower pressure relatively to passage 17, fluid flows around check valve 33, through passage 18, pump 15, passage 17, opening 34, passage 40 and the passage 42. Fluid in excess of the demands of pump 15 is by-passed to the steering circuit via passage 41.

In operation, fluid discharged by engine driven pump 10 is supplied to the inlet of wheel driven pump 15. Since the fluid demand of pump 15 is the product of the displacement of the pump in gallons per revolution and the speed in revolutions per minute, this demand may be larger or smaller than the volume of fluid discharged by the engine driven pump depending on the relative sizes of the two pumps, the engine speed and the ground speed of the vehicle. Assuming first that the volume of fluid supplied by pump means 10 is identical to the fluid demands of pump means 15, and that the wheel driven pump is being driven so that passage 17 serves as the pump suction passage, all fluid discharged by pump means 10 will be required by the pump means 15, and will be discharged through passage 18, opening 35, passage 41, check valve 45, passage 42, passage 23 to the steering circuit 24. In this condition of operation, no fluid is supplied through passage 20. Should the volume of fluid discharged by pump 10 exceed the demands of pump 15, as for example when the vehicle engine is operating at a high rate of speed while the vehicle is moving slowly, all fluid demands of pump 15 will still be supplied by pump 10. Any fluid discharged by pump 10 in excess of the demands of pump 15 will by-pass the pump 15 via passage 40 and check valve 43 which serve as by-pass circuit means in this condition of operation. Should the fluid demands of pump 15 exceed the discharge rate of pump 10, as for example when engine speed is low and the vehicle is moving at a high rate of speed, fluid requirements in excess of what is discharged by pump 10 will be drawn from the reservoir via the passage 20, cavitation check valve 22 and chamber 28.

Should the engine fail so that pump means 10 is no longer discharging fluid, all fluid demands of pump 15 will be supplied via passage 20 and check valve 22 without regard to the direction of operation of that pump. It may be noted that passage 20 and check valve 22 also serve as an anticavitation circuit for pump 10 at times when pump 10 is driven in reverse.

It should be evident from the above that the displacements of pumps 10 and 15 need not be matched and may indeed vary considerably relatively to one another. Pump 15 may be larger or even smaller than pump 10, if desired, depending upon the design characteristics of the system. If pump 15 has a larger displacement than the engine driven pump 10, an adequate supply of fluid will be available for operating the steering circuit even when the vehicle is moving at relatively slow speeds. Several important advantages arise through the use of the series arrangement of engine driven and wheel driven pump provided by the invention. One important advantage is that a relatively large displacement wheel driven pump can be used without overwhelming the steering circuit when both pumps are operating simultaneously. This advantage arises since the fluid dischargedd by the engine driven pump is available at the inlet of the wheel driven pump and is used by that pump. Thus, the rate of flow to the system is always limited by the larger of flow rates of the two pumps. If the volume discharged by the wheel driven pump is equal to or smaller than the engine driven pump, all of the fluid demands of the wheel driven pump will be met by the engine driven pump with any excess being by-passed to the steering circuit via the passage means comprising passage 40 or 41, check valve 43 or 45, cross passage 42 and passage 23. If the volume discharged by the wheel driven pump is greater than the discharge of the engine driven pump, any excess fluid demanded by the wheel driven pump is supplied directly from the reservoir through passage 20 and check valve 22.

Another important advantage of the invention is that the wheel driven pump means 15 is always pumping fluid so that there is no interruption of the supply of fluid delivered to the hydraulic circuit upon engine failure. Still another important advantage of the invention is that the emergency or wheel driven pump 15 may be driven at high speeds without gasification of fluid and cavitation. This is due to the supercharge effect which results because the inlet of the wheel driven pump is pressurized by virtue of the series connection with the outlet of the engine driven pump. The serial arrangement of the engine and wheel driven pumps also leads to a very low power demand on the part of the wheel driven pump due to the high inlet pressure of the latter and the consequent low differential pressure between its inlet and outlet. Because of this the horsepower required to drive the wheel driven pump is relatively low and the pump is not subjected to excessive bearing wear when the engine driven pump is in operation.

The above and other advantages are accomplished with a system which is durable and extremely simple, incorporating only gear pumps and trouble free check valves. Pilot valves, solenoid operated unloading valves and the like are eliminated, thereby reducing cost and enhancing reliability.

What is claimed is:

1. An hydraulic power system for hydraulically operated equipment comprising a first pump, a drive means for operating said first pump, a second pump, drive means for operating said second pump independently of said first pump, fluid passage means interconnecting the first pump with a reservoir, the first pump with the second pump and the second pump with the hydraulically operated equipment, whereby fluid discharged by the first pump is supplied to the second pump, a fluid by-pass around said second pump for conducting fluid supplied by the first pump and not demanded by the second pump to the hydraulically operated equipment, and a supplemental connection between the reservoir and the second pump for supply of fluid to the second pump when its demands are not met by the fluid discharge of said first pump.

2. An hydraulic power system according to claim 1, wherein said pumps are gear pumps.

3. An hydraulic power system according to claim 1, wherein the drive means for said first pump includes a drive connection to the engine of a vehicle and wherein the drive means for the second pump includes a drive connection with the wheels of the vehicle.

4. An hydraulic power system according to claim 3, wherein said second pump is adapted to be reversibly operated and is provided with passages serving alternately as supply and discharge passages according to the direction of operation of the pump, wherein said fluid by-pass for the second pump includes a pair of branch passages having connections with the passages serving as supply and discharge passages for the second pump, and further having valve means for channeling fluid discharged from the first pump through the branch passage connected to the passage serving as supply passage for the second pump with any excess fluid being by-passed to the hydraulic equipment, said valve means being further operative to channel fluid discharged from said second pump through said passage serving as discharge passage and through said other branch passage to the hydraulic equipment.

5. In equipment for a vehicle or the like having hydraulically operated means and motor driven pump means having supply and discharge passages for delivering fluid from a reservoir of fluid to the hydraulically operated means, auxiliary pump means driven independently of the motor driven pump means whenever the vehicle is in motion, said auxiliary pump means having passages serving as fluid supply and discharge passages, means connecting the discharge passage of the motor driven pump means with the passage serving as supply passage for the auxiliary pump means, means connecting the passage serving as discharge passage of the auxiliary pump means with the hydraulically operated means, a fluid connection between the reservoir and the passage of the auxiliary pump serving as supply passage, fluid by-pass means for by-passing the auxiliary pump, said fluid connection with reservoir providing for supply of fluid demands of the auxiliary pump means in excess of the fluid supplied by the motor driven pump means, said fluid by-pass means providing a path to the hydraulically operated means for fluid supplied by the motor driven pump means in excess of the fluid demands of said auxiliary pump means.

6. In equipment according to claim 5 wherein said pump means comprise gear pumps.

7. In equipment according to claim 6 wherein said auxiliary pump is reversibly operable and wherein check means are provided between said passages serving as fluid supply and discharge passages and the discharge passage of the motor driven pump, for channeling fluid demanded by said auxiliary pump from the motor driven pump to the passage serving as supply passage and for blocking fluid from the passage serving as discharge passage to the passage serving as supply passage.

8. In equipment according to claim 7, further including check means between the passages serving as supply and discharge passages and the hydraulically operated means for preventing flow from the passage serving as discharge passage to the passage serving as supply passage.

9. In equipment according to claim 5 wherein said fluid connection between the reservoir and the passage of the auxiliary pump serving as supply passage is the anticavitation circuit for the engine driven pump at times when the engine driven pump is operated in reverse.

10. In equipment for use in a vehicle or the like having a hydraulically operated system, a motor driven pump having supply and discharge passages for delivery of fluid under pressure to the hydraulically operated system from a reservoir of fluid; an auxiliary pump driven by the vehicle independently of the motor driven pump whenever the vehicle is in motion, conduit means serially connecting the reservoir with the motor driven pump and the motor driven pump with the auxiliary pump whereby fluid discharged by the motor driven pump is supplied to the auxiliary pump, by-pass conduit means providing for the by-pass to the control system of any fluid discharged by the motor driven pump and not required by the auxiliary pump and a fluid communication between the reservoir and the inlet of the auxiliary pump for supplying any fluid demands of the auxiliary pump in excess of the fluid discharged by the motor driven pump.

11. Equipment according to claim 10, wherein the pumps are of different displacements.

12. In equipment for a vehicle or the like having hydraulically operated mechanism and engine driven pump means for the supply of pressurized hydraulic fluid whenever the engine is in operation, an auxiliary pump means for the supply of operating fluid when the engine is not in operation and the vehicle is in motion, said auxiliary pump means having passages serving alternatively for the supply and discharge of operating fluid in accordance with the direction of operation of the auxiliary pump means by the vehicle, conduit means connecting the inlet of the engine driven pump with the reservoir and the outlet of the engine driven pump with the passages of the auxiliary pump means, the conduit means having check valve means for channeling flow from the engine driven pump means to the passage of auxiliary pump means serving as the supply passage and for preventing the flow of fluid from the passage serving as discharge passage back to the conduit means, second conduit means interconnecting the reservoir with the passage serving as supply passage for the auxiliary pump means so as to provide for the supply of any fluid demanded by the auxiliary pump means which is not supplied by the engine driven pump means, third conduit means connecting the passage serving as supply and discharge passages for the auxiliary pump means with a common connection to the hydraulically operated system, the third conduit means having check valve means for channeling to the hydraulically operated system any fluid discharged by the auxiliary pump means and any fluid discharged by the engine driven pump means and not demanded by the auxiliary pump means.

* * * * *